Patented Sept. 5, 1939

2,171,635

UNITED STATES PATENT OFFICE 2,171,635

METHOD OF MAKING ABRASIVE ARTICLES

Norman P. Robie, Niagara Falls, N. Y., and Walter D. Rossow, Tiffin, Ohio, assignors, by mesne assignments, to The Carborundum Company, Niagara Falls, N. Y., a corporation of Delaware No Drawing. Application August 21, 1936, Serial No. 97,206

3 Claims. (Cl. 51—278)

This invention relates to the manufacture of resin bonded abrasive articles and particularly to a method of coating the abrasive granules with the resin bond preparatory to forming the abrasive article.

Abrasive articles, to a large extent, are made by mixing abrasive granules with a dry, powdered resin and, since the dry, powdered resin is not particularly adhesive and because the resin usually is much more finely divided than the abrasive granules, it is necessary to wet the mixture with a liquid. This liquid is usually termed the plasticizer and performs the function of converting the dry mix into one having plasticity so that the mixture will hold together when pressed.

It has been considered necessary in the past to use as a plasticizer a material that not only would wet the abrasive grains and the powdered resin but also would act as a partial solvent, at least, for the resin and this belief has led to the use of materials broadly classified as organic materials. Such materials as furfural, xylene, benzene, furfuryl alcohol, benzaldehyde, gasolene, kerosene and liquid resin have been the ones more commonly used. Some of these exert a solvent action on the resin and others do not, but it has been the practice when using non-solvent plasticizers to use also one of the materials that exerts a solvent action on the resin.

It has been proposed also to use an aqueous solution of a resin as a plasticizing material. Here again, the plasticizer was a solvent for the resin and was made to exert a solvent action by the addition of some such material as ammonium hydroxide or sodium hydroxide or borax.

The difficulty in using a solvent plasticizer, whether the plasticizer be entirely of solvent material or only partly so, is that the dissolved resin becomes gummy and interferes with the thorough mixing of the ingredients and with the distribution of the mix in the mold. Because of the gummy characteristic of the dissolved resin, the mix has a tendency to ball up, so that thorough mixing is extremely difficult to obtain and in addition the mix thus formed does not flow freely and therefore can not be uniformly distributed in the mold.

The manufacturers of resin bonded abrasives have been searching diligently for a long time for a method of mixing abrasive granules and dry powdered resin in such a way that the resulting mix would be of the character used in the manufacture of ceramic bonded abrasives, that is, it has been desired to make the resin bonded mixtures of the substantially dry free-flowing and easily distributable nature of the ceramic bonded mixes wherein the abrasive grains are mixed with clay and temporary binder and a small amount of water is added to plasticize the mix. The water in this case does not dissolve the clay but merely wets it and causes it to adhere to the abrasive granules.

The object of the present invention is to overcome the foregoing and other difficulties characteristic of resin bonded mixes.

We have found that a very satisfactory mix for the manufacture of resin bonded abrasives can be obtained by the use of substantially pure water as the wetting medium. By substantially pure water we mean water obtainable from the usual city water supply system. Such water may contain many elements in addition to the chemical elements of hydrogen and oxygen, but the term substantially pure water is used in this disclosure and the appended claims to differentiate from water to which some resin solvent material has been added.

In practicing our invention, we can mix the dry ingredients first and then add the water or we can wet the grain with a small quantity of water and then mix the dry powdered resin with the thus wetted grain. This latter method has the advantage of causing the resin particles to be attached to the abrasive granules without the formation of lumps of resin particles.

In some cases, when it is desired to incorporate a high percentage of resin with the abrasive granules, we can apply one coating of resin and substantially pure water and then repeat the process by adding another coating or further coatings of resin and water until the desired amount of resin is mixed with the granules. The application of a plurality of coatings of resin and water is best accomplished by causing each previous coating to dry or at least partially dry before the next coating is applied.

One typical mix made in accordance with our invention is as follows:

800 grams of fused alumina abrasive granules of what is commonly known as 12 grit are wet with 30 grams of substantially pure water and there is then mixed with the thus wetted grains 200 grams of dry powdered potentially reactive phenolic condensation resin.

Inasmuch as the water is not a solvent for the resin and therefore does not cause the resin to adhere tenaciously to the grain when the mixing is started, the mixing can be accomplished best by methods or apparatus that do not violently agitate the mixture. One method by which satisfactory mixing can be accomplished comprises turning the materials over and over on a sheet of paper or the like by lifting first one end and then the other end of the paper.

The type of motion imparted to the mixture of the kind disclosed herein by a barrel slowly rotating about its longitudinal axis when that axis is inclined from the horizontal also is satisfactory for the purpose.

If desired, the mix thus formed can be used for the molding of articles without further treatment. On the other hand, if it is desired to store the mix thus made or to add further resin, the mix is subjected to a drying treatment to remove the water. This drying treatment can be a rapid one or it can be a slow one. Rapid drying produces coated grains having the appearance of being dusty, although they are not dusty in the sense that the material adhering to the granules can be brushed off readily.

The mix formed by slowly drying the wet resin coated particles does not have the dusty appearance; the grains have the appearance of being coated with a glassy material. In either case, that is, whether the drying treatment is rapid or slow, the granules can be separated into individual, loose or unattached particles without difficulty and will remain so for indefinite periods in storage.

Another typical mix made in accordance with our invention is given in the following example:

800 grams of fused alumina abrasive granules commonly designated as 12 grit are wetted with 40 grams of substantially pure water and then there is mixed with the thus wetted granules 200 grams of dry powdered glycerol phthalic anhydride resin. The wetted grains and resin are thoroughly mixed and then treated in the manner described in the above example.

The resins given in the above examples are what are known as condensation resins and are typical of that class of resins as distinguished from the class of resins commonly referred to as the polymerization resins. Other resins of the class known as condensation resins can be used in practicing this invention.

The mix formed in accordance with the present invention is useful in making both molded articles, such as wheels, sticks, rubs and the like, and coated articles, such as surface discs, belts and what is commonly referred to as sandpaper or emery cloth.

In making molded articles, the coated granules can be agglomerated by heating them in a suitably shaped mold, with or without pressure, and the curing of the bond can be accomplished by further heating after the article is removed from the mold.

The granular material prepared in accordance with this invention can be applied to a suitable backing, such as paper, cloth, fibre and metal, by first coating the backing with a suitable adhesive, such as a resin in liquid form, and then depositing the coated granules on the adhesive coated surface.

The present invention has the advantage of being inexpensive and at the same time very effective. The water used to plasticize the mix is very readily removed therefrom but whether or not it is removed either in whole or in part is of no consequence because it does not alter the characteristics of the resinous material. This can not be said of the plasticizers heretofore used. Some of these are difficultly removable from the resin and therefore are a source of variation in the characteristics of the ultimate abrasive article.

Some plasticizers very rapidly dissolve resin and therefore make mixing a serious problem. The substantially pure water used in the present invention has no apparent solvent action on the resin and therefore does not cause any difficulty in mixing.

Some of the plasticizers heretofore used either are resinous to start with or resinify during the curing operation and therefore must be accounted for in making up the formula for the mix because the quantity of bond included in an abrasive article must be very closely controlled. This causes the further difficulty that the wetness or the plasticity of the mix can not be varied readily because the addition of a resin plasticizer or a plasticizer that becomes converted into a resin alters the quantity of bond in the mix. Thus, if the mix first made up is not of the desired plasticity, it can be brought to the desired plasticity only by adding grain along with the plasticizer. If plasticizer only were added, the ratio of bond to grain would be higher than desired. Even the addition of grain and plasticizer, however, introduces a complication because then the ratio of dry resin to liquid resin is changed and a change in that ratio can result in an article of undesired characteristics because the two resins do not cure to the same stage. The amount of water added as a plasticizer can be adjusted to meet the particular requirements of the mix without affecting the characteristics of the resulting article. Thus, if a given quantity of water does not produce the desired degree of plasticity, more water can be added without in any way affecting the ultimate article.

The granules of the present invention are particularly useful in making porous articles because they can be agglomerated without pressure and because the resin coating does not flow readily when heated. Resins that have been plasticized with a resin solvent become quite fluid under heat and cause the particles of abrasive material to draw closer together and thus form a denser article.

Having thus described our invention, we claim:

1. The process of manufacturing abrasive articles which comprises the steps of wetting granular abrasive material with substantially pure water, mixing dry powdered condensation resin with the thus wetted granular material, and drying the coated granules to cause the granular material to become coated with resin and applying sufficient heat to a mass of the coated granules to unite the granules into a unitary structure.

2. The process of manufacturing abrasive articles which comprises the steps of wetting granular abrasive material with substantially pure water, mixing dry powdered condensation resin with the thus wetted granular material, drying, at least partially, the resin coated granules thus formed, wetting the dried coated granules with substantially pure water, mixing therewith more dry powdered condensation resin, to form a further resin coating on the granules, and applying sufficient heat to a mass of the coated granules to unite the granules into a unitary structure.

3. In the production of abrasive granules having successive individual resin coatings the steps of wetting granular abrasive material with substantially pure water, mixing dry powdered condensation resin with the thus wetted granular material, drying, at least partially, the coated granules, wetting the dried coated granules with substantially pure water, mixing therewith more dry powdered condensation resin, and again drying the granules thus coated.

NORMAN P. ROBIE.
WALTER D. ROSSOW.